(12) United States Patent
Kusuda et al.

(10) Patent No.: US 9,676,975 B2
(45) Date of Patent: Jun. 13, 2017

(54) ADHESIVE COMPOSITION

(71) Applicant: Sekisui Fuller Company, Ltd., Tokyo (JP)

(72) Inventors: Satoshi Kusuda, Shiga (JP); Yukihiko Murayama, Shiga (JP)

(73) Assignee: SEKISUI FULLER COMPANY, LTD., Tokyo (JP)

( * ) Notice: Subject to any disclaimer, the term of this patent is extended or adjusted under 35 U.S.C. 154(b) by 0 days.

(21) Appl. No.: 14/897,719

(22) PCT Filed: Jun. 13, 2014

(86) PCT No.: PCT/JP2014/065801
§ 371 (c)(1),
(2) Date: Dec. 11, 2015

(87) PCT Pub. No.: WO2014/200100
PCT Pub. Date: Dec. 18, 2014

(65) Prior Publication Data
US 2016/0122606 A1    May 5, 2016

(30) Foreign Application Priority Data

Jun. 14, 2013  (JP) .................................. 2013-125477
Dec. 20, 2013  (JP) .................................. 2013-263800

(51) Int. Cl.
*C09J 171/02*  (2006.01)
*C09J 163/00*  (2006.01)
*C08G 65/336*  (2006.01)
*C08K 9/04*  (2006.01)

(52) U.S. Cl.
CPC .......... *C09J 171/02* (2013.01); *C08G 65/336* (2013.01); *C08K 9/04* (2013.01); *C09J 163/00* (2013.01); *C09J 2463/003* (2013.01); *C09J 2471/003* (2013.01)

(58) Field of Classification Search
CPC ................................................... C09J 171/02
See application file for complete search history.

(56) References Cited

U.S. PATENT DOCUMENTS

| | | | |
|---|---|---|---|
| 5,889,124 A | 3/1999 | Ando et al. | |
| 2001/0008692 A1* | 7/2001 | Shirakawa | C08G 18/283 428/413 |
| 2002/0169259 A1* | 11/2002 | Okuhira | C08G 18/58 525/524 |
| 2003/0236345 A1* | 12/2003 | Morii | C22B 1/244 524/556 |
| 2004/0063018 A1* | 4/2004 | Silence | G03G 9/09791 430/108.4 |
| 2005/0272835 A1* | 12/2005 | Iwakiri | C08G 65/336 523/218 |
| 2006/0005967 A1* | 1/2006 | Sirola | C04B 28/04 166/293 |
| 2008/0076878 A1* | 3/2008 | Wakioka | C08G 65/336 525/190 |
| 2010/0190014 A1* | 7/2010 | Burckhardt | C07C 251/08 428/423.1 |

FOREIGN PATENT DOCUMENTS

| | | |
|---|---|---|
| JP | 9-24198 | 9/1997 |
| JP | 2000-169822 | 6/2000 |
| JP | 2001-11422 | 1/2001 |
| JP | 2001-220516 | 8/2001 |
| JP | 2004-59613 | 2/2004 |
| JP | 2007-269988 | 10/2007 |
| JP | 2009-249418 | 10/2009 |
| JP | 2012-82290 | 4/2012 |
| JP | 2012-117266 | 6/2012 |
| JP | 2013-221308 | 10/2013 |

OTHER PUBLICATIONS

International Search Report issued Jul. 22, 2914 in International Application No. PCT/JP2014/065801.

* cited by examiner

*Primary Examiner* — Megan McCulley
(74) *Attorney, Agent, or Firm* — Wenderoth, Lind & Ponack, L.L.P.

(57) ABSTRACT

The present invention provides an adhesive composition excellent in adhesive strength. The adhesive composition of the present invention contains 100 parts by weight of polyalkylene oxide having a hydrolyzable silyl group, 1 to 20 parts by weight of an epoxy resin, 0.1 to 10 parts by weight of an epoxysilane coupling agent, 0.5 to 20 parts by weight of a ketimine compound, and 1 to 100 parts by weight of fatty acid-treated calcium oxide.

7 Claims, No Drawings

ADHESIVE COMPOSITION

TECHNICAL FIELD

The present invention relates to an adhesive composition, which has excellent adhesive strength under cold conditions and is capable of forming an adhesive layer that can maintain the excellent adhesive strength even in contact with alkaline moisture.

BACKGROUND ART

Conventionally, concrete has been frequently used for inner walls, outer walls, and floors in a building structure. In order to improve durability and design of the concrete, an exterior wall finishing material (for example, tiles) is adhesively integrated with the concrete surface by intermediary of an adhesive layer.

An adhesive layer can be obtained by applying an adhesive composition to the concrete surface and then curing the adhesive composition. As an example of such an adhesive composition, a moisture curable resin composition, characterized by containing (a) an oxyalkylene-based polymer having a reactive silicon group, (b) a reaction product of a dibutyltin salt and ethyl orthosilicate, (c) an epoxy resin, and (d) a ketimine compound serving as a latent curing agent for (c), has been used (for example, Patent Literature 1).

CITATION LIST

Patent Literature

Patent Literature 1: Japanese Patent Application Laid-Open No. 2007-269988

SUMMARY OF INVENTION

Technical Problem

On the other hand, after the completion of a building structure, concrete is brought into contact with water content, such as moisture in the air and rainwater. Since concrete contains calcium hydroxide and the like, the water content exhibits alkalinity upon coming into contact with the concrete. An adhesive layer formed from the moisture curable resin composition of Patent Literature 1 has a problem of reduction in adhesive strength over time when being brought into contact with alkaline moisture.

Further, in a cold region where the outside air temperature becomes extremely low in the winter, the adhesive layer formed from the moisture curable resin composition of Patent Literature 1 has the problem of reduction in adhesive strength.

Thus, an object of the present invention is to provide an adhesive composition, which has excellent adhesive strength not only under cold conditions, but also in contact with alkaline moisture.

Means for Solving Problem

The adhesive composition of the present invention contains 100 parts by weight of polyalkylene oxide having a hydrolyzable silyl group, 1 to 20 parts by weight of an epoxy resin, 0.1 to 10 parts by weight of an epoxysilane coupling agent, 0.5 to 20 parts by weight of a ketimine compound, and 1 to 100 parts by weight of fatty acid-treated calcium oxide.

Advantageous Effects of Invention

The adhesive composition of the present invention can form an adhesive layer excellent in adhesive strength after curing. In particular, the adhesive composition of the present invention can form an adhesive layer excellent in adhesive strength under both low temperature conditions and normal temperature conditions. Further, the adhesive composition of the present invention can form an adhesive layer that maintains excellent adhesive strength even in contact with alkaline moisture.

Thus, according to the adhesive composition of the present invention, the peeling of the adhesive layer from concrete or an exterior wall finishing material is reduced even when it is kept for a long time in a severe environment exposed to rainwater or in a cold region, such as in the outdoors. Therefore, it is possible to maintain aesthetic appearance of the exterior wall finishing material over a long period of time.

DESCRIPTION OF EMBODIMENTS (Polyalkylene Oxide Having Hydrolyzable Silyl Group)

The adhesive composition of the present invention contains polyalkylene oxide having a hydrolyzable silyl group. The polyalkylene oxide has a hydrolyzable silyl group at a terminal or a side chain of a polyalkylene oxide chain. Having a hydrolyzable silyl group at a side chain of a polyalkylene oxide chain means to include both the case where a hydrolyzable silyl group is contained as a side chain of a polyalkylene oxide chain and the case where a hydrolyzable silyl group is contained as a part of a side chain of a polyalkylene oxide chain.

The hydrolyzable silyl group is a group in which 1 to 3 hydrolyzable groups are bonded to a silicon atom. Hydrolyzable groups of the hydrolyzable silyl group are not particularly limited and examples thereof include a hydrogen atom, an alkoxy group, an acyloxy group, a ketoxymate group, an acid amide group, an aminooxy group, a mercapto group, and an alkenyloxy group. Of these, an alkoxy group is preferable. The alkoxy group hardly generates harmful by-products after a reaction.

Examples of the alkoxysilyl group include trialkoxysilyl groups, such as a trimethoxysilyl group, a triethoxysilyl group, a triisopropoxysilyl group, and a triphenoxysilyl group; dimethoxysilyl groups, such as a dimethoxymethylsilyl group, and a diethoxymethylsilyl group; and monoalkoxysilyl groups, such as a methoxydimethoxysilyl group and an ethoxydimethylsilyl group. Of these, a dimethoxysilyl group and a trimethoxysilyl group are particularly preferable.

The average number of the hydrolyzable silyl groups per polyalkylene oxide molecule is preferably from 1 to 2. The polypropylene oxide preferably has the hydrolyzable silyl groups at both terminals of the main chain. The adhesive composition containing such a polypropylene oxide can form an adhesive layer that maintains excellent adhesive strength even in the presence of alkaline moisture and also under cold conditions.

It is noted that the average number of the hydrolyzable silyl groups per polyalkylene oxide molecule can be calculated on the basis of a concentration of the hydrolyzable silyl groups in the polyalkylene oxide obtained by $^1$H-NMR, and a number average molecular weight of the polyalkylene oxide obtained by a GPC method.

The main chain backbone of the polyalkylene oxide having the hydrolyzable silyl groups is preferably constituted with a polymer having repeating units represented by a general formula: —(R—O)$_n$— (wherein R denotes an alkylene group having 1 to 14 carbons and n denotes a positive integer expressing the number of repeating units). The main chain backbone of the polyalkylene oxide may comprise one kind of repeating units or two or more kinds of repeating units.

Examples of the main chain backbone of the polyalkylene oxide include polyethylene oxide, polypropylene oxide, polybutylene oxide, polytetramethylene oxide, a polyethylene oxide-polypropylene oxide copolymer, and a polypropylene oxide-polybutylene oxide copolymer. Of these, polypropylene oxide is preferable. The adhesive composition containing the polypropylene oxide can form an adhesive layer that maintains excellent adhesive strength even in the presence of alkaline moisture and also under cold conditions.

The number average molecular weight of the polyalkylene oxide is preferably 3,000 to 50,000 and more preferably 10,000 to 20,000. A too high number average molecular weight of the polyalkylene oxide may increase viscosity of the adhesive composition, which leads to a reduction in applicability of the adhesive composition. On the other hand, a too low number average molecular weight of the polyalkylene oxide may lead the adhesive composition containing such a polyalkylene oxide to form an adhesive layer that is rigid and fragile and exhibit poor adhesive strength under cold conditions.

It is noted that, in the present invention, the number average molecular weight of the polyalkylene oxide is a value in terms of polystyrene measured by GPC (gel permeation chromatography). Specifically, 6 to 7 mg of the polyalkylene oxide is collected and the collected polyalkylene oxide is supplied into a test tube. An ortho-dichlorobenzene (o-DCB) solution containing 0.05% by weight of dibutylhydroxytoluene (BHT) is prepared and added into the test tube to obtain a diluted solution, in which the polyalkylene oxide is adjusted to a concentration of 1 mg/mL. A measurement sample is prepared by shaking the above diluted solution at 145° C. at a rotation speed of 25 rpm for 1 hour with a dissolution-filtration apparatus to dissolve the polyalkylene oxide into the solution. The number average molecular weight of the polyalkylene oxide can be measured by the GPC method using the thus prepared measurement sample.

The number average molecular weight of the polyalkylene oxide can be measured, for example, by the following measurement apparatus and measurement conditions.
Measurement apparatus: a product name "HLC-8121GPC/HT," manufactured by TOSOH Corp.
Measurement conditions Column: TSKgelGMHHR-H(20)HT×3 and TSKguardcolumn-HHR(30)HT×1
  Mobile phase: o-DCB 1.0 mL/min
  Sample concentration: 1 mg/mL
  Detector: Blythe type refractometer
  Standard substance: polystyrene (manufactured by TOSOH Corp., molecular weight: 500 to 8,420,000)
  Elution condition: 145° C.
  SEC temperature: 145° C.

As the polyalkylene oxide having the hydrolyzable silyl groups, a commercially available product may be used. Examples thereof include MS polymers S-203 and S-303 (product names, manufactured by Kaneka Corp.); Silyl Polymers SAT-200, SAT-350, and SAT-400 (product names, manufactured by Kaneka Corp.); and EXCESTAR ESS-3620, ESS-2420, ESS-2410, and ESS-3430 (product names, manufactured by Asahi Glass Co., Ltd.).

Further it is also possible to use polyalkylene oxide having trialkoxysilyl groups at both the terminals of a polyalkylene oxide chain by intermediary of urethane bonds. Polyalkylene oxide having trimethoxysilyl groups at both the terminals of the polyalkylene oxide chain by intermediary of the urethane bonds is preferable. The polyalkylene oxide having the urethane bonds near the trialkoxysilyl groups enables the formation of an adhesive layer that maintains excellent adhesive strength even in the presence of alkaline moisture and also under cold conditions. Examples of the trialkoxysilyl group include a trimethoxysilyl group, a triethoxysilyl group, a triisopropoxysilyl group, and a triphenoxysilyl group.

The polyalkylene oxide having the trialkoxysilyl groups at both the terminals of the polyalkylene oxide chain by intermediary of the urethane bonds can be obtained, for example, by preparing polyalkylene oxide having hydroxyl groups at both terminals and reacting both the hydroxyl groups with a compound having a trimethoxysilyl group and an isocyanate group.

Examples of the polyalkylene oxide having hydroxyl groups at both the terminals include polyethylene oxide glycol (polyoxyethylene glycol), polypropylene oxide glycol (polyoxypropylene glycol), polypropylene oxide glycol (polyoxybutylene glycol), polytetramethylene oxide glycol (polyoxytetramethylene glycol), polyethylene oxide-polypropylene oxide glycol (polyoxyethylene-polyoxypropylene glycol), and polypropylene oxide-polybutylene oxide glycol (polyoxypropylene-polyoxybutylene glycol).

Examples of the compound having a trialkoxysilyl group and an isocyanate group include 1-isocyanate methyl trimethoxysilane, 2-isocyanate ethyl trimethoxysilane, 3-isocyanate propyl trimethoxysilane, 3-isocyanate butyl trimethoxysilane, 3-isocyanate pentyl trimethoxysilane, 1 isocyanate propyl trimethoxysilane, 1-isocyanate methyl triethoxysilane, 2-isocyanate ethyl triethoxysilane, 3-isocyanate propyl triethoxysilane, 3-isocyanate butyl triethoxysilane, 3-isocyanate pentyl triethoxysilane, and 1-isocyanate propyl triethoxysilane.

The polyalkylene oxide having the trialkoxysilyl groups at both the terminals of the polyalkylene oxide chain by intermediary of the urethane bonds can be synthesized by: mixing polyalkylene oxide having hydroxyl groups at both terminals and a compound having a trialkoxysilyl group and an isocyanate group to obtain a mixture; and stirring the mixture to react the hydroxyl groups at both the terminals of the polyalkylene oxide and the isocyanate group of the above compound, to thereby form urethane bonds. Further, the stirring of the above-mentioned mixture with heating can promote the reaction.

As the polyalkylene oxide having the trialkoxysilyl groups at both the terminals of the polyalkylene oxide chain by intermediary of the urethane bonds, a commercially available product may be used. Examples of the polyalkylene oxide having polypropylene oxide as a main chain backbone and the trimethoxysilyl groups at both the terminals of the main chain backbone by intermediary of the urethane bonds include Desmoseal (registered trademark) XP2749, manufactured by Bayer Co., Ltd.

The adhesive composition may optionally contain a (meth)acrylate-based polymer. The (meth)acrylate-based polymer has a trialkoxysilyl group at a side chain or a terminal of a main chain backbone. The main chain backbone of the (meth)acrylate-based polymer is a copolymer of monomers including methyl(meth)acrylate and butyl(meth)acrylate, preferably a copolymer of monomers including methyl methacrylate and butyl acrylate, and more preferably a copolymer of monomers including methyl methacrylate and n-butyl acrylate. The (meth)acrylate-based polymer having the above-mentioned copolymers as the main chain backbone enables the formation of an adhesive layer that has excellent weather resistance and also maintains excellent adhesive strength even in the presence of alkaline moisture. It is noted that (meth)acrylate means methacrylate and/or acrylate. Examples of the trialkoxysilyl group include a trimethoxysilyl group, a triethoxysilyl group, a triisopropoxysilyl group, and a triphenoxysilyl group.

The contained amount of the methyl(meth)acrylate component in the (meth)acrylate-based polymer is preferably 3 to 70% by weight and more preferably 5 to 50% by weight. Having the contained amount of the methyl(meth)acrylate component of 3% by weight or more enables the formation of an adhesive layer excellent in weather resistance. Having the contained amount of the methyl(meth)acrylate component of 70% by weight or less allows the adhesive composition to exhibit excellent workability.

In the (meth)acrylate-based polymer, the contained amount of the butyl(meth)acrylate component is preferably 30 to 97% by weight and more preferably 50 to 95% by weight. Having the contained amount of the butyl(meth)acrylate component of 30% by weight or more allows the adhesive composition to exhibit excellent workability. Having the contained amount of the butyl(meth)acrylate component of 97% by weight or less enables the formation of an adhesive layer excellent in weather resistance.

In the (meth)acrylate-based polymer, the monomers used in the copolymer constituting the main chain backbone may further include another monomer other than methyl(meth)acrylate, butyl acrylate, and butyl methacrylate. Examples of the another monomer include styrene, styrene derivatives, such as indene, α-methylstyrene, p-methylstyrene, p-chlorostyrene, p-chloromethylstyrene, p-methoxystyrene, p-tert-butoxystyrene, and divinylbenzene; compounds having a vinyl ester group, such as vinyl acetate, vinyl propionate, vinyl butyrate, vinyl caproate, vinyl benzoate, and vinyl cinnamate; and compounds having a vinyloxy group, such as maleic anhydride, N-vinylpyrrolidone, N-vinylmorpholine, methacrylonitrile, acrylonitrile, acrylamide, methacrylamide, N-cyclohexylmaleimide, N-phenylmaleimide, N-laurylmaleimide, N-benzylmaleimide, n-propyl vinyl ether, n-butyl vinyl ether, isobutyl vinyl ether, tert-butyl vinyl ether, tert-amyl vinyl ether, cyclohexyl vinyl ether, 2-ethylhexyl vinyl ether, dodecyl vinyl ether, octadecyl vinyl ether, 2-chloroethyl vinyl ether, ethylene glycol butyl vinyl ether, triethylene glycol methyl vinyl ether, (4-vinyloxy)butyl benzoate, ethylene glycol divinyl ether, diethylene glycol divinyl ether, triethylene glycol divinyl ether, tetraethylene glycol divinyl ether, butane-1,4-diol-divinyl ether, hexane-1,6-diol-divinyl ether, cyclohexane-1,4-dimethanol-divinyl ether, di(4-vinyloxy)butyl isophthalate, di(4-vinyloxy)butyl glutarate, succinic acid di(4-vinyloxy)butyl, trimethylolpropane trivinyl ether, 2-hydroxyethyl vinyl ether, 4-hydroxybutyl vinyl ether, 6-hydroxyhexyl vinyl ether, cyclohexane-1,4-dimethanol monovinyl ether, diethylene glycol monovinyl ether, 3-aminopropyl vinyl ether, 2-(N,N-diethylamino)ethyl vinyl ether, urethane vinyl ether, and polyester vinyl ether. These monomers may be used alone or in combination of two or more kinds thereof.

A method for polymerizing the (meth)acrylate-based polymer is not particularly limited, and known methods may be used. Examples thereof include various polymerization methods, such as a free radical polymerization method, an anionic polymerization method, a cationic polymerization method, a UV radical polymerization method, a living anionic polymerization method, a living cationic polymerization method, and a living radical polymerization method.

The (meth)acrylate-based polymer has a trialkoxysilyl group at a terminal or a side chain of the main chain backbone. The (meth)acrylate-based polymer preferably has a trimethoxysilyl group at a side chain or a terminal of the main chain backbone. In the (meth)acrylate-based polymer, having a trialkoxysilyl group at a side chain of the main chain backbone means to include both the case where the trialkoxysilyl group is contained as a side chain of the main chain backbone and the case where the trialkoxysilyl group is contained as a part of a side chain of the main chain backbone. The combined use of the (meth)acrylate-based polymer with the above-mentioned polyalkylene oxide allows the adhesive composition to exhibit excellent workability, and also enables the formation of an adhesive layer that maintains excellent adhesive strength even in the presence of alkaline moisture.

A method of introducing the trialkoxysilyl group into the (meth)acrylate-based polymer is not particularly limited and examples thereof includes a method including introducing an unsaturated group into a copolymer of monomers including methyl(meth)acrylate, butyl acrylate, and butyl methacrylate and then hydrosilylating the unsaturated group by an action of hydrosilane having a trialkoxysilyl group.

The weight average molecular weight of the (meth)acrylate-based polymer is preferably 1,000 to 50,000, more preferably 2,000 to 30,000, and particularly preferably 30,000 to 15,000. According to the (meth)acrylate-based polymer having the weight average molecular weight within the above range, the adhesive composition exhibits excellent workability.

The contained amount of the (meth)acrylate-based polymer in the adhesive composition is preferably 5 to 300 parts by weight, more preferably 10 to 200 parts by weight, and particularly preferably 30 to 100 parts by weight, relative to 100 parts by weight of the polyalkylene oxide having a hydrolyzable silyl group. Having the contained amount of the (meth)acrylate-based polymer of 5 parts by weight or more in the adhesive composition enables the formation of an adhesive layer that maintains excellent adhesive strength even in the presence of alkaline moisture and also exhibits excellent weather resistance. Having the contained amount of the (meth)acrylate-based polymer of 300 parts by weight or less in the adhesive composition allows the adhesive composition to exhibit excellent workability.

(Epoxy Resin)

The adhesive composition of the present invention contains an epoxy resin. Examples of the epoxy resin include: a bisphenol A type epoxy resin as a reaction product of bisphenol A and epichlorohydrin, a bisphenol F type epoxy resin as a reaction product of bisphenol F and epichlorohydrin, and epoxy resins of hydrogenated compounds thereof; a glycidyl ester type epoxy resin; a novolak type epoxy resin; an urethane-modified epoxy resin; a nitrogen-containing epoxy resin produced by epoxidizing meta-xylylenedi, hydantoin, etc.; and a rubber-modified epoxy resin containing polybutadiene or NBR (acrylonitrile-butadiene copolymer). Of these, a bisphenol A type epoxy resin is preferable. The use of the bisphenol A type epoxy resin is preferable since an adhesive layer obtained by curing such an adhesive composition maintains excellent adhesive strength even in the presence of alkaline moisture and also under cold conditions.

The epoxy equivalent of the epoxy resin is preferably 180 to 200 g/eq and more preferably 185 to 195 g/eq. The adhesive composition containing the epoxy resin of which the epoxy equivalent is within the above range can form an adhesive layer excellent in mechanical strength and toughness. It is noted that "the epoxy equivalent" is a value obtained by dividing the molecular weight of an epoxy compound by the number of epoxy groups per molecule of the epoxy compound.

It is noted that, in the present invention, the epoxy equivalent of an epoxy resin is defined as a value measured in accordance with JIS K7236 (2009).

The contained amount of the epoxy resin in the adhesive composition is 1 to 20 parts by weight, preferably 5 to 20 parts by weight, and more preferably 10 to 20 parts by weight, relative to 100 parts by weight of the polyalkylene oxide having a hydrolyzable silyl group. The adhesive composition having the epoxy resin of which contained amount is within the above range can form an adhesive layer that maintains excellent adhesive strength even in the presence of alkaline moisture and also under cold conditions.

(Ketimine Compound)

The adhesive composition of the present invention contains a ketimine compound. The ketimine compound means a dehydrated condensate of an amine compound having two or more amine groups in one molecule and a ketone compound. The ketimine compound is used as a latent curing agent. The ketimine compound itself is stably present in the adhesive composition without reacting with the epoxy resin in the absence of moisture. However, the ketimine compound becomes a primary amine by reacting with water, such as moisture in the air. The primary amine thus made can react with the epoxy resin and promote the curing of the adhesive composition.

Examples of the ketimine compound include 2,5,8-triaza-1,8-nonadien, 2,10-dimethyl-3,6,9-triaza-2,9-undecadien, 2,10-diphenyl-3,6,9-triaza-2,9-undecadien, 3,11-dimethyl-4,7,10-triaza-3,10-tridecadiene, 3,11-diethyl-4,7,10-triaza-3,10-tridecadiene, 2,4,12,14-tetramethyl-5,8,11-triaza-4,11-pentadecadiene, 2,4,20,22-tetramethyl-5,12,19-triaza-4,19-trieicosadiene, and 2,4,15,17-tetramethyl-5,8,11,14-tetraaza-4,14-octadecadiene.

The ketimine compounds may be used alone or in combination of two or more kinds thereof. Of these, 2,10-dimethyl-3,6,9-triaza-2,9-undecadien is preferable as the ketimine compound.

In the adhesive composition, a molar ratio [(total number of moles of epoxy groups in epoxy resin)/(total number of moles of amino groups in amine compound that is a hydrolyzate of ketimine compound)] is preferably 0.7 or more and more preferably 1.0 or more since an adhesive layer obtained by curing such an adhesive composition maintains excellent adhesive strength even in the presence of alkaline moisture and also under cold conditions. In the adhesive composition, the molar ratio [(total number of moles of epoxy groups in epoxy resin)/(total number of moles of amino groups in amine compound that is a hydrolyzate of ketimine compound)] is preferably 1.2 or less since an adhesive layer obtained by curing such an adhesive composition maintains excellent adhesive strength even in the presence of alkaline moisture and also under cold conditions. For example, the molar ratio [(total number of moles of epoxy groups in epoxy resin)/(total number of moles of amino groups in amine compound that is a hydrolyzate of ketimine compound)] being 0.7 or less means that the number of epoxy groups is 0.7 or less per amino group.

When the adhesive composition has the molar ratio [(total number of moles of epoxy groups in epoxy resin)/(total number of moles of amino groups in amine compound that is a hydrolyzate of ketimine compound)] within the above preferable range and further contains an aminosilane coupling agent described below, it is possible to form an adhesive layer that maintains more excellent adhesive strength even in the presence of alkaline moisture and also under cold conditions.

The total number of moles of epoxy groups in the epoxy resin and the total number of moles of amino groups in the amine compound can be calculated from the molecular weights of the epoxy resin and the amine compound and the number of functional groups of the epoxy resin and the amine compound, respectively. Specifically, the total number of moles of epoxy groups in the epoxy resin is a value obtained by dividing the contained amount of the epoxy resin by the epoxy equivalent. The total number of moles of amino groups in the amine compound is defined as a value obtained by dividing the amount of the amine compound that is the hydrolyzate of the ketimine compound by the amine equivalent. It is noted that the amine equivalent of the amine compound is defined as a value measured in accordance with JIS K7237 "Testing method for total amine values of amine-based hardeners of epoxide resins".

The contained amount of the ketimine compound in the adhesive composition is 0.5 to 20 parts by weight and preferably 1 to 20 parts by weight, relative to 100 parts by weight of the polyalkylene oxide having a hydrolyzable silyl group. The adhesive composition having the ketimine compound of which contained amount is within the above range can form an adhesive layer obtained by curing such an adhesive composition, with the adhesive layer maintaining excellent adhesive strength even in the presence of alkaline moisture and also under cold conditions.

(Fatty Acid-Treated Calcium Oxide)

The adhesive composition of the present invention contains fatty acid-treated calcium oxide. The adhesive composition containing the fatty acid-treated calcium oxide allows an adhesive layer obtained by curing such an adhesive composition to maintain excellent adhesive strength even in the presence of alkaline moisture and also under cold conditions.

Fatty acid-treated calcium oxide is calcium oxide having a surface treated with a fatty acid. Examples of the fatty acid include saturated fatty acids, such as decanoic acid, dodecanoic acid, tetradecanoic acid, pentadecanoic acid, hexadecanoic acid, heptadecanoic acid, octadecanoic acid, and icosanoic acid; and unsaturated fatty acids, such as hexadecenoic acid, octadecenoic acid, octadecadienoic acid, octadecatrienoic acid, icosanoic acid, icosadienoic acid, icosatrienoic acid, icosatetratrienoic acid, and tetradocosanoic acid. These fatty acids may be used alone or in combination of two or more kinds thereof. Of these, octadecanoic acid is preferable. Octadecanoic acid exhibits excellent compatibility with the polyalkylene oxide, the epoxy resin, etc. described above.

The average particle diameter of the fatty acid-treated calcium oxide is preferably 0.05 to 100 μm and more preferably 1 to 50 μm. The fatty acid-treated calcium oxide having the average particle diameter within the above range can be highly dispersed in the adhesive composition, which makes it possible to form an adhesive layer that maintains excellent adhesive strength even in the presence of alkaline moisture and also under cold conditions.

It is noted that the average particle diameter of the fatty acid-treated calcium oxide can be measured by a laser diffraction/scattering particle size distribution analyzer. For example, the average particle diameter of the fatty acid-treated calcium oxide can be measured as follows: the fatty acid-treated calcium oxide is added to methanol so as to have a concentration of 10% by weight, and ultrasonic irradiation is performed with an output of 1 kw for 10 min using an ultrasonic homogenizer to obtain a suspension; then, using this suspension, the volume particle distribution of the fatty acid-treated calcium oxide is measured by the laser diffraction/scattering particle size distribution analyzer (for example, a device name "SACD-2100", manufactured by Shimadzu Corp.); and then, a value at cumulative 50% of the volume particle distribution is defined as the average particle diameter of the fatty acid-treated calcium oxide.

The contained amount of the fatty acid-treated calcium oxide in the adhesive composition is 1 to 100 parts by weight, preferably 20 to 100 parts by weight, and more preferably 40 to 100 parts by weight, relative to 100 parts by weight of the polyalkylene oxide having a hydrolyzable silyl group, since an adhesive layer obtained by curing such an adhesive composition maintains excellent adhesive strength even in the presence of alkaline moisture and also under cold conditions.

(Epoxysilane Coupling Agent)

The adhesive composition of the present invention contains an epoxysilane coupling agent. The epoxysilane coupling agent means a compound that includes a silicon atom bonded to an alkoxy group and a functional group having an epoxy group in one molecule. The epoxysilane coupling agent enables the formation of an adhesive layer that maintains excellent adhesive strength even in the presence of alkaline moisture and also under cold conditions.

Specific examples of the epoxysilane coupling agent include 3-glycidoxypropyltrimethoxysilane, 3-glycidoxypropyltriethoxysilane, 3-glycidoxypropyl methyldimethoxysilane, 3-glycidoxypropylethyldiethoxysilane, and 2-(3,4 epoxycyclohexyl)ethyltrimethoxysilane. The epoxysilane coupling agents may be used alone or in combination of two or more kinds thereof. Of these, 3-glycidoxypropyltrimethoxysilane is preferable.

The contained amount of the epoxysilane coupling agent in the adhesive composition is 0.1 to 10 parts by weight and preferably 1 to 5 parts by weight, relative to 100 parts by weight of the polyalkylene oxide having a hydrolyzable silyl group, since it is possible to form an adhesive layer that maintains excellent adhesive strength even in the presence of alkaline moisture and also under cold conditions.

(Silanol condensation catalyst)

The adhesive composition of the present invention preferably contains a silanol condensation catalyst. The silanol condensation catalyst is a catalyst for promoting a dehydration condensation reaction between silanol groups, which are formed by hydrolysis of hydrolyzable silyl groups in the polyalkylene oxide. It is noted that a silanol group means a hydroxy group that is directly bonded to a silicon atom (≡Si—OH).

Examples of the silanol condensation catalyst include 1,1,3,3-tetrabutyl-1,3-dilauryloxycarbonyl-distannoxane, dibutyltin dilaurate, dibutyltin oxide, dibutyltin diacetate, dibutyltin phthalate bis(dibutyltin laurate)oxide, dibutyltin bisacetylacetonate, dibutyltin bis(monoestermaleate), tin octylate, dibutyltin octoate, dioctylate oxide, tin compounds having an alkoxysilyl group, tetra-n-butoxytitanate, tetraisopropoxy titanate, and dibutylamine-2-ethylhexoate. Of these, 1,1,3,3-tetrabutyl-1,3-dilauryloxycarbonyl-distannoxane is preferable from the viewpoint of maintaining storage stability of the adhesive composition. The silanol condensation catalysts may be used alone or in combination of two or more kinds thereof.

The contained amount of the silanol condensation catalyst in the adhesive composition is preferably 0.1 to 3 parts by weight, more preferably 1 to 3 parts by weight, and particularly preferably 1 to 2.5 parts by weight, relative to 100 parts by weight of the polyalkylene oxide having a hydrolyzable silyl group. A too low contained amount of the silanol condensation catalyst in the adhesive composition may raise a concern that curing takes a longer time. On the other hand, a too high contained amount of the silanol condensation catalyst in the adhesive composition may raise a concern that adhesive strength of an adhesive layer obtained by curing such an adhesive composition is decreased by alkaline moisture or under cold conditions.

(Other Additives)

The adhesive composition of the present invention may optionally further contain other additives. Examples of the other additives include a dehydrating agent, an antioxidant, a filler, a plasticizer, an anti-sagging agent, an ultraviolet absorbing agent, a pigment, a solvent, and a perfume agent.

(Dehydrating Agent)

The adhesive composition of the present invention preferably further contains a dehydrating agent. The dehydrating agent can prevent the adhesive composition from being cured by water, such as moisture in the air, in storing the adhesive composition.

Examples of the dehydrating agent include silane compounds, such as vinyl trimethoxysilane, dimethyldimethoxysilane, tetraethoxysilane, methyl trimethoxysilane, methyltriethoxysilane, tetramethoxysilane, phenyltrimethoxysilane, and diphenyldimethoxysilane; and ester compounds, such as trimethyl orthoformate, triethyl orthoformate, trimethyl orthoacetate, and triethyl orthoacetate. These dehydrating agents may be used alone or in combination of two or more kinds thereof. Of these, vinyl trimethoxysilane is preferable.

The contained amount of the dehydrating agent in the adhesive composition is preferably 0.5 to 20 parts by weight, more preferably 1 to 10 parts by weight, and particularly preferably 1 to 5 parts by weight, relative to 100 parts by weight of the polyalkylene oxide having a hydrolyzable silyl group.

(Aminosilane Coupling Agent)

The adhesive composition of the present composition preferably further contains an aminosilane coupling agent. The aminosilane coupling agent means a compound that includes a silicon atom bonded to an alkoxy group and a functional group having an amino group in one molecule. The aminosilane coupling agent, when used in combination with the epoxysilane coupling agent, allows an adhesive layer obtained by curing such an adhesive composition to maintain excellent adhesive strength even in the presence of alkaline moisture and also under cold conditions.

Specific examples of the aminosilane coupling agent include N-β(aminoethyl)γ-aminopropylmethyldimethoxysilane, N-β(aminoethyl)γ-aminopropyltrimethoxysilane, N-β(aminoethyl)γ-aminopropyltriethoxysilane, γ-aminopropyltrimethoxysilane, and γ-aminopropyltriethoxysilane. The aminosilane coupling agents may be used alone or in combination of two or more kinds thereof. Of these, N-β(aminoethyl)γ-aminopropyltrimethoxysilane is preferable.

Regarding the contained amount of the aminosilane coupling agent in the adhesive composition, a ratio of the total number of moles of epoxy groups in the epoxysilane coupling agent to the total number of moles of amino groups in the aminosilane coupling agent ((total number of moles of epoxy groups in epoxysilane coupling agent)/(total number of moles of amino groups in aminosilane coupling agent)) is preferably 2.5 or more, since an adhesive layer obtained by curing such an adhesive composition maintains excellent adhesive strength even in the presence of alkaline moisture and also under cold conditions. On the other hand, the ratio of the total number of moles of epoxy groups in the epoxysilane coupling agent to the total number of moles of amino groups in the aminosilane coupling agent ((total number of moles of epoxy groups in epoxysilane coupling agent)/(total number of moles of amino groups in aminosilane coupling agent)) is preferably 5.0 or less and more preferably 3.0 or less since an adhesive layer obtained by curing such an adhesive composition maintains excellent adhesive strength even in the presence of alkaline moisture and also under cold conditions. It is noted that, for example, the ratio of the total number of moles of epoxy groups in the epoxysilane coupling agent to the total number of moles of amino groups in the aminosilane coupling agent ((total number of moles of epoxy groups in epoxysilane coupling agent)/(total number of moles of amino groups in aminosilane coupling agent)) being 2.5 or more means that the number of the epoxy groups is 2.5 or more per amino group.

The total number of moles of epoxy groups in the epoxysilane coupling agent and the total number of moles of amino groups in the aminosilane coupling agent can be calculated from the molecular weights of the epoxysilane coupling agent and the aminosilane coupling agent and the number of functional groups of the epoxysilane coupling agent and the aminosilane coupling agent, respectively. Specifically, the total number of moles of the epoxy groups in the epoxysilane coupling agent is a value obtained by dividing the contained amount of the epoxysilane coupling agent by the epoxy equivalent. The total number of moles of the amino groups in the aminosilane coupling agent is a value obtained by dividing the contained amount of the aminosilane coupling agent by the amine equivalent. It is noted that, in the present invention, the epoxy equivalent in the epoxysilane coupling agent is defined as a value measured in accordance with JIS K7236 (2009). Further, the amine equivalent in the aminosilane coupling agent is defined as a value measured in accordance with JIS K7237 "Testing method for total amine values of amine-based hardeners of epoxide resins".

(Antioxidant)

The adhesive composition of the present invention preferably further contains an antioxidant. Examples thereof include a hindered phenol-based antioxidant, a monophenol-based antioxidant, a bisphenol-based antioxidant, and a polyphenol-based antioxidant. Of these, a hindered phenol-based antioxidant is preferable. Specific examples of the hindered phenol-based antioxidant include pentaerythritol tetrakis[3-(3,5-di-tert-butyl-4-hydroxyphenyl)propionate], octadecyl-3-(3,5-di-tert-butyl-4-hydroxyphenyl)propionate], and N,N'-hexane-1,6-diylbis[3-(3,5-di-tert-butyl-4-hydroxyphenylpropionamide)]. The antioxidants may be used alone or in combination of two or more kinds thereof.

The contained amount of the antioxidant in the adhesive composition is preferably 0.1 to 20 parts by weight and more preferably 0.3 to 10 parts by weight, relative to 100 parts by weight of the polyalkylene oxide having a hydrolyzable silyl group.

(Filler)

The adhesive composition of the present invention preferably further contains a filler. Examples thereof include calcium carbonate, magnesium carbonate, hydrous silicic acid, anhydrous silicic acid, calcium silicate, silica, titanium dioxide, clay, talc, carbon black, and a glass balloon. The fillers may be used alone or in combination of two or more kinds thereof.

(Plasticizer)

The adhesive composition of the present invention preferably further contains a plasticizer. The adhesive composition containing the plasticizer allows an adhesive layer obtained by curing such an adhesive composition to maintain excellent adhesive strength over a long period of time even under cold conditions.

Examples of the plasticizer include phthalic esters, such as dimethyl phthalate, diethyl phthalate, dibutyl phthalate, diisobutyl phthalate, dinormalhexyl phthalate, bis(2-ethylhexyl) phthalate, dinormaloctyl phthalate, diisononyl phthalate, dinonyl phthalate, diisodecyl phthalate, diisoundecyl phthalate, and bis(butylbenzyl) phthalate; and polyalkylene glycols, such as diethylene glycol, triethylene glycol, tetraethylene glycol, dipropylene glycol, tripropylene glycol, and tetrapropylene glycol. Of these, polyalkylene glycols are preferable and polypropylene glycols are more preferable.

The number average molecular weight of the polyalkylene glycols is preferably 1,000 to 10,000 and more preferably 2,000 to 5,000. The adhesive composition containing such polyalkylene glycols having the number average molecular weight thereof within the above range allows an adhesive layer obtained by curing the adhesive composition to maintain excellent adhesive strength over a long period of time even under cold conditions.

It is noted that, in the present invention, the number average molecular weight of the polyalkylene glycols and the number average molecular weight of the polyalkylene oxide are values in terms of polystyrene measured by GPC (gel permeation chromatography). The measuring method and conditions in details are the same as those for the polyalkylene oxide described above.

The contained amount of the plasticizer in the adhesive composition is preferably 1 to 50 parts by weight and more preferably 10 to 40 parts by weight, relative to 100 parts by weight of the polyalkylene oxide having a hydrolyzable silyl group.

(Anti-Sagging Agent)

The adhesive composition of the present invention may contain an anti-sagging agent. Examples the anti-sagging agent include hydrogenated castor oil, fatty acid bisamide, and fumed silica.

(Ultraviolet Absorbing Agent)

The adhesive composition of the present invention may contain an ultraviolet absorbing agent. Examples the ultraviolet absorbing agent include a hindered amine-based light stabilizer, such as bis(2,2,6,6-tetramethyl-4-piperidyl) sebacate, and a benzotriazole-based ultraviolet absorbing agent.

The adhesive composition of the present invention is preferably used for adhesively integrating an exterior wall finishing material with a concrete surface. Specifically, the adhesive composition is applied on the concrete surface, and then an exterior wall finishing material is laminated on the applied adhesive composition. After they are allowed to stand for curing, the adhesive composition is cured to form an adhesive layer. As a result, there is obtained a building structure, in which the exterior wall finishing material is adhesively integrated with the concrete surface by intermediary of the adhesive layer formed by curing the adhesive composition. Examples of the exterior wall finishing material include mortars, tiles, bricks, porcelains, and stones.

EXAMPLES

The present invention will be described in more detail by way of Examples below. However, the present invention is not limited thereto.

Examples 1 to 15 and Comparative Examples 1 to 7

The following components were blended at the blending amounts shown in Tables 1 to 3 and kneaded under a vacuum atmosphere for 60 minutes using a planetary mixer to obtain respective adhesive compositions.

Polyalkylene oxide 1 (polyalkylene oxide of which a main chain backbone is formed by polypropylene oxide and which has a dimethoxysilyl group at a terminal of the main chain backbone, the average number of the dimethoxysilyl groups per molecule of 1.4, the number average molecular weight of 20,000, a product name "MS polymer S-203," manufactured by Kaneka Corp.), Polyalkylene oxide 2 (polyalkylene oxide of which a main chain backbone is formed by polypropylene oxide and which has trimethoxysilyl groups at both terminals of the main chain backbone by intermediary of urethane bond, the average number of the dimethoxysilyl groups per molecule of 1.8, the number average molecular weight of 13,000, a viscosity of 5,000 mPa·s at 25° C., a product name "Desmoseal" (registered trademark) XP2749," manufactured by Bayer Co., Ltd.), (Meth)acrylate-based polymer (a (meth)acrylate-based polymer of which a main chain backbone is formed by methyl methacrylate-n-butyl acrylate copolymer (the contained amount of methyl methacrylate component: 25% by weight, the contained amount of n-butyl acrylate component: 75% by weight) and which has a trimethoxysilyl group at a terminal or a side chain of the main chain backbone, the weight average molecular weight of 3,200, the average number of the trimethoxysilyl groups per molecule of 0.9, ARUFON US-6110 manufactured by Toagosei Co., Ltd.), Epoxy resin 1 (a bisphenol A type epoxy resin with the epoxy equivalent of 189 g/eq, a product name "EPIKOTE 828," manufactured by Japan Epoxy Resins Co., Ltd.), Epoxy resin 2 (a bisphenol F type epoxy resin with the epoxy equivalent of 250 g/eq, a product name "EPIKOTE 806F," manufactured by Japan Epoxy Resins Co., Ltd.), Fatty acid-treated calcium oxide (calcium oxide surface-treated with octadecanoic acid, the average particle diameter of 10 μm, a product name "CML#31," manufactured by Ohmi Chemical Industry Co., Ltd.), Calcium oxide (no surface treatment) (a product name "CML#35," manufactured by Ohmi Chemical Industry Co., Ltd.), Ketimine compound (a product name "Eponit K-100," manufactured by Nitto Chemical Industry Co., Ltd.), Silanol condensation catalyst (1,1,3,3-tetrabutyl-1,3-dilauryloxycarbonyl-distannoxane, a product name "NEOSTANN U-130," manufactured by Nitto Chemical Industry Co., Ltd.), Dehydrating agent (vinyl trimethoxysilane, a product name "NUC SILICONE A171," manufactured by NUC Corp.), Epoxysilane coupling agent (3-glycidoxypropyltrimethoxysilane, a product name "KBM-403," manufactured by Shin-Etsu Chemical Co., Ltd.), Aminosilane coupling agent (N-(2-aminoethyl)-3-aminopropyltrimethoxysilane, a product name "KBM-603," manufactured by Shin-Etsu Chemical Co., Ltd.), Filler (colloidal calcium carbonate, a product name "CCR," manufactured by Shiraishi Kogyo Kaisha, Ltd.), and Plasticizer (polypropylene glycol, the number average molecular weight of 3,000, a product name "P-3000," manufactured by Adeka Corp.).

It is noted that Tables 1 to 3 each shows the total number of moles of epoxy groups in the epoxy resin (E1), the total number of moles of amino groups in the amine compound that is the hydrolyzate of the ketimine compound (A1), and a molar ratio thereof (E1/A1). Further, Tables 1 to 3 each shows the total number of moles of epoxy groups in the epoxysilane coupling agent (E2), the total number of moles of amino groups in the aminosilane coupling agent (A2), and a molar ratio thereof (E2/A2).

(Evaluation)

In accordance with JIS A5557, a standard mortar test specimen and porcelain mosaic tiles were adhesively integrated with each other by a curable composition. The integrated product was subjected to standard curing, and then adhesive strength was measured. Adhesive strength was measured after performing an alkaline warm water immersion treatment or a freezing and thawing treatment. The results are shown in Tables 1 to 3.

TABLE 1

| | | Example | | | | | | | |
|---|---|---|---|---|---|---|---|---|---|
| | | 1 | 2 | 3 | 4 | 5 | 6 | 7 | 8 |
| Blend amount [parts by weight] | Polyalkylene oxide 1 | 100 | 100 | 100 | 100 | 100 | 100 | 100 | 100 |
| | Polyalkylene oxide 2 | 0 | 0 | 0 | 0 | 0 | 0 | 0 | 0 |
| | (Meth)acrylate-based polymer | 0 | 0 | 0 | 0 | 0 | 0 | 0 | 0 |
| | Epoxy resin 1 | 10 | 1 | 20 | 10 | 10 | 10 | 10 | 10 |
| | Epoxy resin 2 | 0 | 0 | 0 | 0 | 0 | 0 | 0 | 0 |
| | Fatty acid-treated calcium oxide | 40 | 40 | 40 | 1 | 100 | 40 | 40 | 40 |
| | Calcium oxide (No surface treatment) | 0 | 0 | 0 | 0 | 0 | 0 | 0 | 0 |
| | Ketimine compound | 10 | 1 | 20 | 10 | 10 | 9 | 15 | 15 |
| | Silanol condensation catalyst | 2 | 2 | 2 | 2 | 2 | 2 | 2 | 2 |
| | Dehydrating agent | 5 | 5 | 5 | 5 | 5 | 5 | 5 | 5 |
| | Epoxysilane coupling agent | 4 | 4 | 4 | 4 | 4 | 4 | 4 | 4 |
| | Aminosilane coupling agent | 0 | 0 | 0 | 0 | 0 | 0 | 0 | 0.5 |
| | Filler | 150 | 150 | 150 | 150 | 150 | 150 | 150 | 150 |
| | Plasticizer | 30 | 30 | 30 | 30 | 30 | 30 | 30 | 30 |
| Total number of moles of epoxy groups in epoxy resin (E1) | | 0.0529 | 0.0053 | 0.1058 | 0.0529 | 0.0529 | 0.0529 | 0.0529 | 0.0529 |
| Total number of moles of amino groups in amine compound that is a hydrolyzate of ketimine compound (A1) | | 0.0467 | 0.0047 | 0.0934 | 0.0467 | 0.0467 | 0.0420 | 0.0701 | 0.0701 |

TABLE 1-continued

|  |  |  | Example | | | | | | | |
|---|---|---|---|---|---|---|---|---|---|---|
|  |  |  | 1 | 2 | 3 | 4 | 5 | 6 | 7 | 8 |
| Molar ratio (E1/A1) | | | 1.1 | 1.1 | 1.1 | 1.1 | 1.1 | 1.3 | 0.8 | 0.8 |
| Total number of moles of epoxy groups in epoxysilane coupling agent (E2) | | | 0.017 | 0.017 | 0.017 | 0.017 | 0.017 | 0.017 | 0.017 | 0.017 |
| Total number of moles of amino groups in aminosilane coupling agent (A2) | | | — | — | — | — | — | — | — | 0.004 |
| Molar ratio (E2/A2) | | | — | — | — | — | — | — | — | 4.5 |
| Evaluation | Adhesive strength [N/mm²] | Standard curing | 1.5 | 0.9 | 1.8 | 0.9 | 1.9 | 1.1 | 1.7 | 2.0 |
|  |  | Alkaline warm water immersion treatment | 1.3 | 0.5 | 1.5 | 0.6 | 1.5 | 0.6 | 0.9 | 2.2 |
|  |  | Freezing and thawing treatment | 1.4 | 0.7 | 1.6 | 0.5 | 0.8 | 0.6 | 0.7 | 2.0 |

TABLE 2

|  |  | Example | | | | | | |
|---|---|---|---|---|---|---|---|---|
|  |  | 9 | 10 | 11 | 12 | 13 | 14 | 15 |
| Blend amount [parts by weight] | Polyalkylene oxide 1 | 100 | 100 | 100 | 0 | 100 | 0 | 100 |
|  | Polyalkylene oxide 2 | 0 | 0 | 0 | 100 | 0 | 100 | 0 |
|  | (Meth)acrylate-based polymer | 0 | 0 | 0 | 0 | 40 | 40 | 0 |
|  | Epoxy resin 1 | 10 | 10 | 10 | 10 | 10 | 10 | 0 |
|  | Epoxy resin 2 | 0 | 0 | 0 | 0 | 0 | 0 | 15 |
|  | Fatty acid-treated calcium oxide | 40 | 40 | 40 | 40 | 40 | 40 | 40 |
|  | Calcium oxide (No surface treatment) | 0 | 0 | 0 | 0 | 0 | 0 | 0 |
|  | Ketimine compound | 15 | 10 | 10 | 15 | 15 | 15 | 15 |
|  | Silanol condensation catalyst | 2 | 3 | 4 | 2 | 2 | 2 | 2 |
|  | Dehydrating agent | 5 | 5 | 5 | 5 | 5 | 5 | 5 |
|  | Epoxysilane coupling agent | 4 | 4 | 4 | 4 | 4 | 4 | 4 |
|  | Aminosilane coupling agent | 0.8 | 0 | 0 | 0.8 | 0.8 | 0.8 | 0 |
|  | Filler | 150 | 150 | 150 | 150 | 150 | 150 | 150 |
|  | Plasticizer | 30 | 30 | 30 | 30 | 30 | 30 | 30 |
| Total number of moles of epoxy groups in epoxy resin (E1) | | 0.0529 | 0.0529 | 0.0529 | 0.0529 | 0.0529 | 0.0529 | 0.0600 |
| Total number of moles of amino groups in amine compound that is a hydrolyzate of ketimine compound (A1) | | 0.0701 | 0.0467 | 0.0467 | 0.0701 | 0.0701 | 0.0701 | 0.0701 |
| Molar ratio (E1/A1) | | 0.8 | 1.1 | 1.1 | 0.3 | 0.8 | 0.8 | 0.9 |
| Total number of moles of epoxy groups in epoxysilane coupling agent (E2) | | 0.017 | 0.017 | 0.017 | 0.017 | 0.017 | 0.017 | 0.017 |
| Total number of moles of amino groups in aminosilane coupling agent (A2) | | 0.006 | — | — | 0.006 | 0.006 | 0.006 | — |
| Molar ratio (E2/A2) | | 2.8 | — | — | 2.8 | 2.8 | 2.8 | — |
| Evaluation | Adhesive strength [N/mm²] Standard curing | 2.2 | 1.1 | 0.9 | 2.4 | 2.3 | 2.6 | 1.5 |
|  | Alkaline warm water immersion treatment | 2.3 | 0.8 | 0.7 | 2.5 | 2.3 | 2.5 | 0.5 |
|  | Freezing and thawing treatment | 2.1 | 0.9 | 0.5 | 2.3 | 2.3 | 2.5 | 0.5 |

TABLE 3

|  |  | Comparative Example | | | | | | |
|---|---|---|---|---|---|---|---|---|
|  |  | 1 | 2 | 3 | 4 | 5 | 6 | 7 |
| Blend amount [parts by weight] | Polyalkylene oxide 1 | 100 | 100 | 100 | 100 | 100 | 100 | 100 |
|  | Polyalkylene oxide 2 | 0 | 0 | 0 | 0 | 0 | 0 | 0 |
|  | (Meth)acrylate-based polymer | 0 | 0 | 0 | 0 | 0 | 0 | 0 |
|  | Epoxy resin 1 | 0.5 | 25 | 10 | 10 | 10 | 10 | 10 |
|  | Epoxy resin 2 | 0 | 0 | 0 | 0 | 0 | 0 | 0 |
|  | Fatty acid-treated calcium oxide | 40 | 40 | 0.5 | 110 | 40 | 0 | 40 |
|  | Calcium oxide (No surface treatment) | 0 | 0 | 0 | 0 | 0 | 40 | 0 |
|  | Ketimine compound | 5 | 5 | 5 | 10 | 0.1 | 15 | 15 |
|  | Silanol condensation catalyst | 2 | 2 | 2 | 2 | 2 | 2 | 2 |
|  | Dehydrating agent | 5 | 5 | 5 | 5 | 5 | 5 | 5 |
|  | Epoxysilane coupling agent | 4 | 4 | 4 | 4 | 4 | 4 | 0 |
|  | Aminosilane coupling agent | 0 | 0 | 0 | 0 | 0 | 0 | 0 |

TABLE 3-continued

| | | | Comparative Example | | | | | | |
|---|---|---|---|---|---|---|---|---|---|
| | | | 1 | 2 | 3 | 4 | 5 | 6 | 7 |
| | Filler | | 150 | 150 | 150 | 150 | 150 | 150 | 150 |
| | Plasticizer | | 30 | 30 | 30 | 30 | 30 | 30 | 30 |
| Total number of moles of epoxy groups in epoxy resin (E1) | | | 0.0026 | 0.1323 | 0.0529 | 0.0529 | 0.0529 | 0.0529 | 0.0529 |
| Total number of moles of amino groups in amine compound that is a hydrolyzate of ketimine compound (A1) | | | 0.0234 | 0.0234 | 0.0234 | 0.0467 | 0.0005 | 0.0701 | 0.0701 |
| Molar ratio (E1/A1) | | | 0.1 | 5.7 | 2.3 | 1.1 | 113.3 | 0.8 | 0.8 |
| Total number of moles of epoxy groups in epoxysilane coupling agent (E2) | | | 0.017 | 0.017 | 0.017 | 0.017 | 0.017 | 0.017 | — |
| Total number of moles of amino groups in aminosilane coupling agent (A2) | | | — | — | — | — | — | — | — |
| Molar ratio (E2/A2) | | | — | — | — | — | — | — | — |
| Evaluation | Adhesive strength [N/mm$^2$] | Standard curing | 0.7 | 1.8 | 1.2 | 1.8 | 1.2 | 0.7 | 1.2 |
| | | Alkaline warm water immersion treatment | 0.3 | 1.2 | 0.1 | 1.2 | 0.3 | 0.3 | 0.4 |
| | | Freezing and thawing treatment | 0.2 | 0.3 | 0.1 | 0.2 | 0.2 | 0.2 | 0.4 |

INDUSTRIAL APPLICABILITY

The adhesive composition of the present invention can form an adhesive layer that is excellent in adhesive strength under both low temperature conditions and normal temperature conditions and also maintains the excellent adhesive strength even in contact with alkaline moisture. Thus, the adhesive composition of the present invention can be used, for example, for adhesively integrating an exterior wall finishing material, such as tiles, with a surface of concrete constituting an outer wall and a floor.

The invention claimed is:

1. An adhesive composition comprising 100 parts by weight of polyalkylene oxide having a hydrolyzable silyl group, 1 to 20 parts by weight of an epoxy resin, 0.1 to 10 parts by weight of an epoxysilane coupling agent, 0.5 to 20 parts by weight of a ketimine compound, and 1 to 100 parts by weight of fatty acid-treated calcium oxide.

2. The adhesive composition according to claim 1, wherein the epoxy resin contains a bisphenol A epoxy resin.

3. The adhesive composition according to claim 2, further comprising an aminosilane coupling agent.

4. The adhesive composition according to claim 2, wherein a ratio between a total number of moles of epoxy groups in the epoxy resin and a total number of moles of amino groups in an amine compound that is a hydrolyzate of the ketimine compound is 0.7 to 1.2.

5. The adhesive composition according to claim 1, further comprising an aminosilane coupling agent.

6. The adhesive composition according to claim 5, wherein a ratio between a total number of moles of epoxy groups in the epoxy resin and a total number of moles of amino groups in an amine compound that is a hydrolyzate of the ketimine compound is 0.7 to 1.2.

7. The adhesive composition according to claim 1, wherein a ratio between a total number of moles of epoxy groups in the epoxy resin and a total number of moles of amino groups in an amine compound that is a hydrolyzate of the ketimine compound is 0.7 to 1.2.

* * * * *